G. L. EMERSON.
SPRING MOTOR.
APPLICATION FILED NOV. 7, 1917.
1,276,510.
Patented Aug. 20, 1918.
2 SHEETS—SHEET 1.
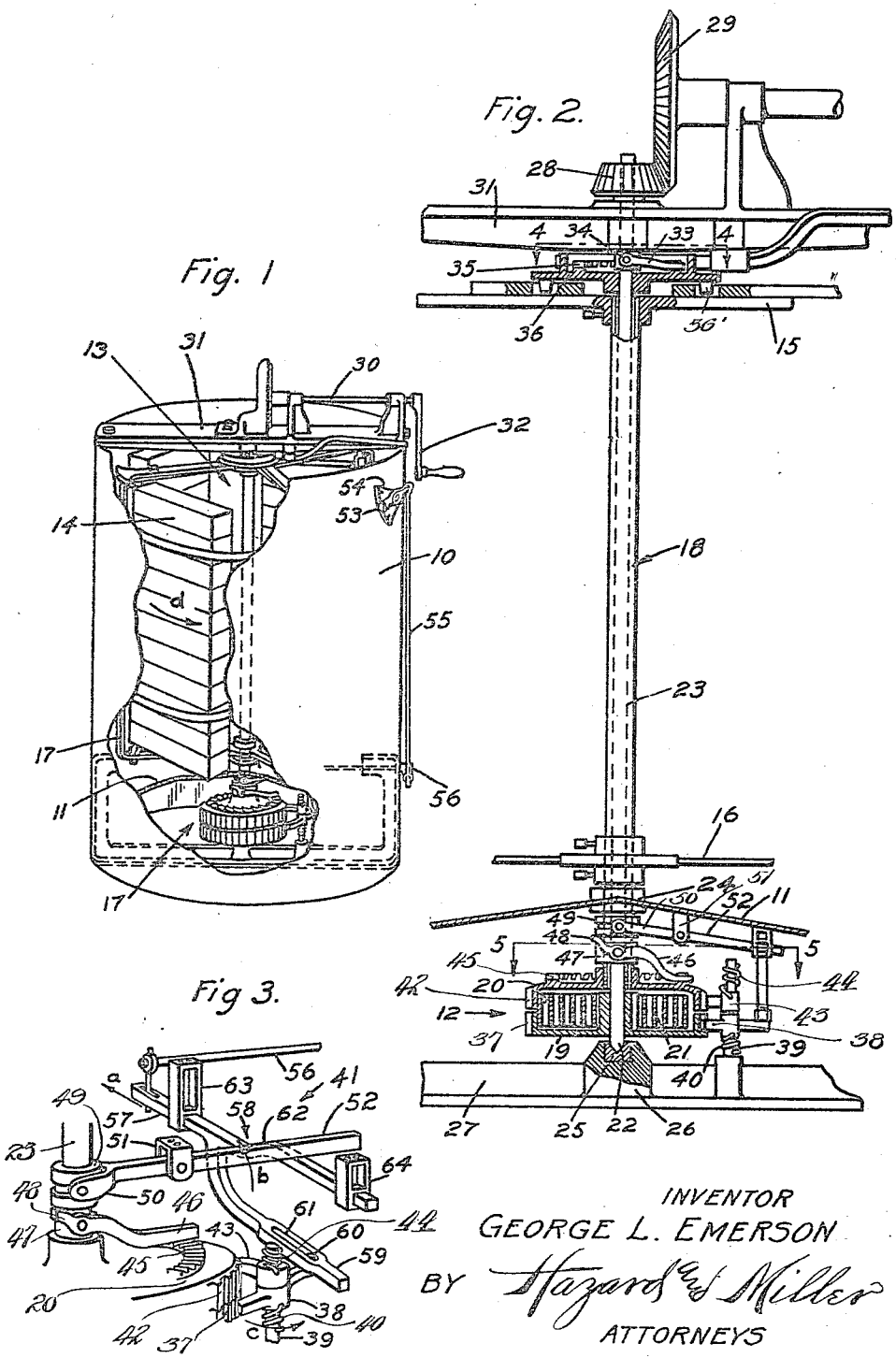
INVENTOR
GEORGE L. EMERSON
BY *Hazard & Miller*
ATTORNEYS

G. L. EMERSON
SPRING MOTOR.
APPLICATION FILED NOV. 7, 1917.

1,276,510.

Patented Aug. 20, 1918.
2 SHEETS—SHEET 2.

INVENTOR
GEORGE L. EMERSON
BY Hazard and Miller
ATTORNEYS

UNITED STATES PATENT OFFICE.

GEORGE L. EMERSON, OF LOS ANGELES, CALIFORNIA.

SPRING-MOTOR.

1,276,510.

Specification of Letters Patent.　Patented Aug. 20, 1918.

Application filed November 7, 1917.　Serial No. 200,832.

*To all whom it may concern:*

Be it known that I, GEORGE L. EMERSON, a citizen of the United States, residing at Los Angeles, in the county of Los Angeles and State of California, have invented new and useful Improvements in Spring-Motors, of which the following is a specification.

This invention relates to a spring motor.

The principal object of this invention is to provide a spring motor adapted to be wound by a shaft which will be driven in the same direction by the motor when the spring unwinds.

Another object of this invention is to provide a spring motor of the above class which may be used in connection with a rotating body to retard its speed of rotation, thereby winding the spring of the motor, after which the energized motor may be used to impart motion to said body, thus providing a motor particularly adapted for use in connection with centrifugally operated honey extractors, so that the energy required to stop the extractor may be utilized to wind the motor and thereafter used to set the extractor in motion.

Another object of this invention is to provide a motor of the above class which is simple in its construction and may be easily controlled and operated to produce the results desired.

Other objects will appear hereinafter.

The invention is illustrated, by way of example, in the accompanying drawings in which:

Figure 1 is a view in perspective illustrating a centrifugally operating honey extractor, with parts broken away to clearly disclose the application of the spring motor thereto.

Fig. 2 is an enlarged fragmentary view illustrating the details of the motor construction and its application to the central operating shaft of the honey extractor.

Fig. 3 is a small view in perspective illustrating the manner in which part of the control mechanism of the motor is actuated.

Figure 4:
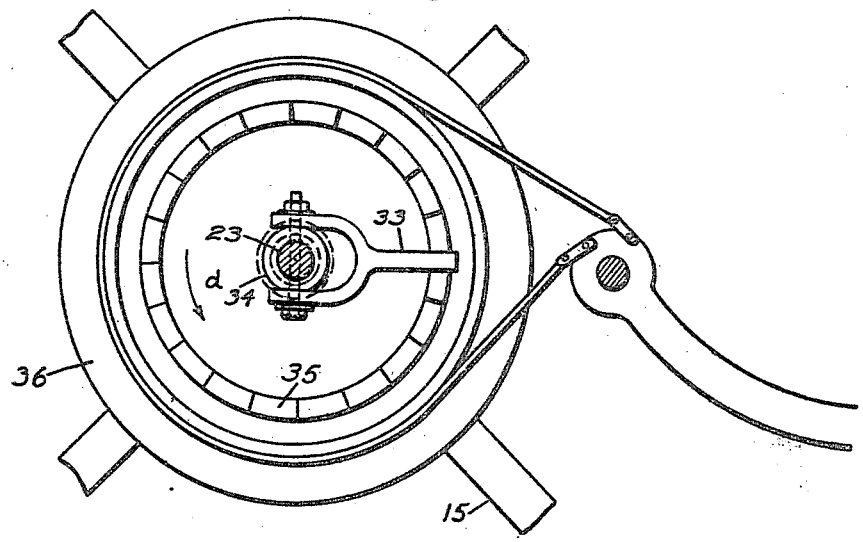
Fig. 4 is an enlarged view in transverse section as seen on the line 4—4 of Fig. 2 illustrating the upper driving elements of the motor as applied to the frame of the extractor.
Figure 5:
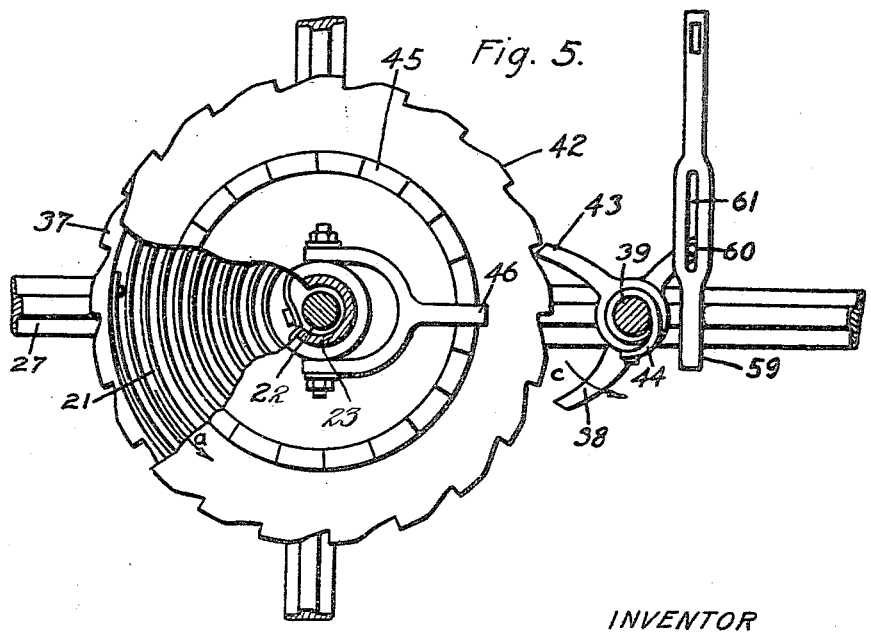
Fig. 5 is an enlarged view in transverse section on the line 5—5 of Fig. 2 illustrating the details of the motor construction.

Referring more particularly to the drawings, 10 indicates the tank of a honey extractor. This tank is preferably cylindrical, having a floor 11 spaced a distance from the ground. The side walls of the tank extend downwardly from the floor 11 to form an inclosure within which a spring motor 12 and its operating mechanism are positioned. Disposed within the tank is a reel 13 upon which are mounted honeycomb baskets 14. This reel is of common construction, having upper and lower radial arms 15 and 16 which are conected at their outer ends by vertical frame members 17. These arms are provided with hubs which position them upon a vertical axle 18, around which they rotate. It is to be understood that the special design of the extractor is immaterial and that it is used merely to illustrate one application of the motor as it will be evident that a motor having the characteristics here described would be valuable in connection with many other mechanisms.

The motor consists of a lower drum 19 and an upper drum 20 which oppose each other and form a housing within which a spirally wound spring 21 is positioned. The lower drum is provided with a hub which is fixed upon the central shaft 22 of the axle 18, while the upper drum is free to rotate around the lower end of an axle sleeve 23 through which the shaft 22 extends. In the present instance both sets of radial arms of the extractor are fixed to rotate with the axle sleeve. The sleeve 23 extends through a bearing 24 in the floor of the tank and only rotates under conditions which will be hereinafter specified. The shaft 22 is rotatably supported by a thrust bearing 25 held upon a bearing block 26 which in turn is mounted within a transverse frame channel 27 beneath the floor of the tank and surrounded by the downwardly extending wall thereof. Secured to the upper end of the shaft 22 is a bevel pinion 28 which is in mesh with a bevel driving gear 29. This gear is fixed to the end of a horizontally disposed crank shaft 30 which is rotatably held within bearings upon a cross head 31 through which the shaft 22 is also supported. The outer end of the shaft 30 is provided with a crank arm 32 by which the shafts 30 and 22 may be driven. Motion is imparted from the driven axle shaft 22 to the reel 13 by a pivoted pawl 33 which is mounted upon a collar 34 secured to the axle shaft and adapted to swing vertically over ratchet teeth 35 which are formed upon the horizontal face of a reversing hub 36. The hub 36 is free to rotate upon the shaft 22 in the opposite direction from the direction in which the pawl 33 will hold and the hub 36 is connected to the reel arms 15 by teeth 36' extending down into recesses in the arms.

The reel is driven by the shaft 22 which may receive its motion from the spring motor 12 when desired. This motor is operatively connected to the shaft through the drum 19 which is pinned upon the shaft. This drum is fastened to the inner end of the coil spring 21, said spring being wrapped around the hub of the drum and its outer end fastened to the circumferential wall of the upper drum 20. The lower drum 19 is provided with ratchet teeth 37 which extend entirely around its outer circumference, and are engaged by a lower drum pawl 38 pivotally mounted above the channel 27 to swing around a vertical pawl pin 39. This pawl is held against the circumference of the drum by a spring 40 and may be relieved therefrom by a control mechanism 41, particularly shown in Fig. 3 of the drawings, and which will be hereinafter described. The teeth upon the lower drum are faced so that when the pawl 38 is in engagement with them the drum will be unable to rotate in the normal direction of travel of the reel. The upper drum 20 is also provided with a set of circumferential teeth, as indicated by the numeral 42. These teeth are formed with their shoulders facing in the opposite direction from the teeth 37 upon the lower drum and are adapted to be engaged by an upper drum pawl 43, also pivotally mounted upon the pin 39 and yieldably held against the teeth 42 by a spring 44.

Formed upon the upper horizontal face of the drum 20 and concentric with the axis thereof is a series of upstanding ratchet teeth 45. These teeth are adapted to be engaged by a winding pawl 46 which is pivotally secured for vertical movement upon a collar 47 fastened above the drum 20 and to the sleeve 23. This pawl is provided with a lifting arm 48 against which a sliding collar 49 may be brought to bear. The collar 49 is preferably positioned above the collar 47 upon the sleeve 23 and is engaged by a yoke lever 50 which is so connected as to shift the collar without preventing its rotation. The lever 50 is mounted upon a suitable bracket 51 beneath the floor of the tank and is formed with a horizontally extending lever arm 52 by which the collar may be moved vertically. This arm is actuated by the control mechanism 41, as particularly shown in Fig. 3.

The control mechanism consists of a hand lever 53 pivotally secured at an accessible point upon the side of the tank 10 and adapted to swing over an indicating quadrant 54. A connecting rod 55 is provided this hand lever and extends downwardly along the side of the tank to be connected to a bell crank 56 which in turn is pivotally connected to a horizontally moving shifting lever 57. This lever extends transversely of the yoke lever 50 and has a bar cam 58 which bears upon the lever arm 52 of the yoke 50 to actuate the yoke to raise and lower the shifting collar 49. A lower slotted bar 59 is also connected with the shifting lever 57 to actuate the lower drum pawl 38. This pawl is fitted with a pin 60 which extends upwardly through a slotted opening 61 in the bar 59 and is so disposed in relation to the cam face 62 of the bar 58 as to cause the shifting lever 50 and the winding pawl 46 to be actuated prior to the actuation of the lower drum pawl 38. The shifting lever and the bars 58 and 59 are slidably supported within suitable bearings 63 and 64.

In operation, the baskets 14 are filled with honeycomb and the extractor made ready for operation. It will be assumed that the motor 12 has been energized and that it is now ready for use. The hand lever 53 is then moved to the starting position as indicated upon the quadrant. This will draw the shifting lever in the direction of the arrow —a— as indicated in Fig. 3. When this is done the cam face 62 of the bar 58 will strike the under face of the yoke lever 52 and will swing it upwardly in the direction of the arrow —b— while moving the shifting collar in a reverse direction to apply pressure to the lifting arm and thereby raise the winding pawl. Continued movement of the shifting lever 57 will bring the end of the slot 61 into engagement with the pin 60 of the lower drum pawl 38 to swing it outwardly in the direction of the arrow —c— and release it from engagement with the lower drum. It is to be borne in mind that the pawl 43 is constantly in engagement with the ratchet teeth 42 of the upper drum 20 and that when the lower drum is released by the above operation the outer end of the spring 21 is held with the drum 20 while the inner end is released and will drive the lower drum 19. As the lower drum is pinned to the lower end of the solid shaft 22 this shaft will be rotated and will act through the pawl 33 fixed at the upper end of the shaft to drive the reel through engagement with the ratchet teeth 35 of the hub 36. This will cause the reel to rotate in the direction of the arrow —d— which is its normal direction of rotation. As the spring unwinds, the inertia of the reel will be overcome and when it reaches a desired speed of rotation may be maintained at such a speed by moving the hand lever 53 to neutral position and manual rotation of the crank shaft 30. It is evident that the power required to keep the reel in rotation will be comparatively small in relation to the force required to overcome the inertia of the reel.

When the desired centrifugal action has extracted the honey from the comb the reel may be retarded and eventually stopped by throwing the winding pawl 46 and the lower drum pawl 38 into engagement with the ratchet teeth 45 and 37, respectively. This will hold the lower drum against movement and thus fix the inner end of the spring 21, while the upper drum will be locked to the sleeve 23 which is rotated by the reel, thus causing the momentum of the reel to revolve the upper drum 20 and wind the spring. It will be noted that the reel always rotates in a single direction of travel and is connected to the spring motor without the use of complicated reversing mechanisms.

When the shifting lever is positioned with its handle 53 in neutral the cam face of the bar cam 58 will have lifted the winding pawl from engagement with the ratchet teeth 45 but will not have moved sufficiently to release the lower drum pawl 38. This will allow the reel to be rotated freely in either direction and will entirely disconnect the motor therefrom.

It will thus be seen that the motor here disclosed will operate continuously with a mechanism rotating in a single direction and will be of great advantage in connection with a mechanism such as the honey extractor here shown in which inertia must be readily overcome and momentum opposed.

While I have shown the preferred construction of my spring motor as now known to me, it will be understood that various changes in the combination, construction and arrangement of parts may be made by those skilled in the art without departing from the spirit of my invention as claimed.

I claim:

1. A spring motor comprising a spirally wound spring, a winding drum in connection with the outer end of said spring, a driving drum in connection with the inner end of said spring, both of said drums being in axial alinement with the center of the spring, a driving shaft rigidly connected to the driving drum, a sleeve positioned over said driving shaft and with which a rotating body is adapted to move, ratchet means whereby the shaft may be connected with said sleeve to rotate it in a single direction, ratchet means for optionally connecting the sleeve with the winding drum, and means whereby said motor may be controlled to wind the spring through the movement of the sleeve or drive the sleeve through the movement of the shaft.

2. A spring motor comprising a spirally wound spring, a winding drum in connection with the outer end of said spring, a driving drum in connection with the inner end of said spring, both of said drums being in axial alinement with the center of the spring, a driving shaft rigidly connected to the driving drum, a sleeve positioned over said driving shaft and with which a rotating body is adapted to move, ratchet means whereby the shaft may be connected with said sleeve to rotate it in a single direction, ratchet means for optionally connecting the sleeve with the winding drum, ratchet means for preventing the recoil of the spring and reverse movement of the winding drum, and ratchet means for releasing the driving drum to permit recoil of the spring and the consequent driving of the shaft.

3. A spring motor comprising a spirally wound spring, a winding drum in connection with the outer end of said spring, a driving drum in connection with the inner end of said spring, both of said drums being in axial alinement with the center of the spring, a driving shaft rigidly connected to the driving drum, a sleeve positioned over said driving shaft and with which a rotating body is adapted to move, ratchet means whereby the shaft may be connected with said sleeve to rotate it in a single direction, ratchet means for optionally connecting the sleeve with the winding drum, ratchet means for preventing the recoil of the spring and reverse movement of the winding drum, ratchet means for releasing the driving drum to permit recoil of the spring and the consequent driving of the shaft, and means for simultaneously actuating the ratchet connecting means between the sleeve and the winding drum and the ratchet means for releasing the driving drum.

4. A spring motor comprising a spirally wound spring, a winding drum in connection with the outer end of said spring, a driving drum in connection with the inner end of said spring, both of said drums being in axial alinement with the center of the spring, a driving shaft rigidly connected to the driving drum, a sleeve positioned over said driving shaft and with which a rotating body is adapted to move, ratchet means whereby the shaft may be connected with said sleeve to rotate it in a single direction, ratchet means for optionally connecting the sleeve with the winding drum, ratchet means for preventing the recoil of the spring and reverse movement of the winding drum, ratchet means for releasing the driving drum to permit recoil of the spring and the consequent driving of the shaft, means for simultaneously actuating the ratchet connecting means between the sleeve and the winding drum and the ratchet means for releasing the driving drum, and means whereby the ratchet means for connecting the sleeve with the winding drum may be released without effecting the releasing means of the driving drum.

5. A spring motor comprising a horizontal rotating body, an axle sleeve to which said body is fixed, a driving shaft extending through the axle sleeve, a ratchet wheel fixed to the body, a pawl pivotally secured to the shaft and adapted to engage the wheel to drive the body in a single direction, crank means by which the driving shaft may be driven, an upper ratchet drum rotatably mounted upon the lower end of the axle sleeve, ratchet teeth upon the upper face of said drum, a pawl secured to the sleeve and adapted to engage the ratchet teeth, ratchet teeth around the periphery of said drum, a check pawl normally held against said periphery to oppose the movement of the drum except in the direction of rotation of the body, a lower ratchet drum secured to the driving shaft, ratchet teeth formed around the periphery of said drum, a releasing pawl adapted to engage said last-named teeth and normally hold the lower drum from rotation in the direction of rotation of the body, a spiral spring interposed between said drums having its outer end fastened to the upper drum and its inner end fastened to the lower drum, and lever controlled means whereby the sleeve pawl and the releasing pawl may be simultaneously thrown into and out of mesh with their respective ratchet teeth, thereby causing the rotation of the body and sleeve to act through the sleeve pawl to wind the spring and when said pawls are released to allow the spring to unwind and drive the lower drum, the drive shaft, and the body through the pawl pivotally secured to the upper end of the shaft.

6. A spring motor comprising a spirally wound spring, a winding drum in connection with one end of the spring, a driving drum in connection with the other end of the spring; both of said drums being in axial alinement with the center of the spring; a driving shaft rigidly connected to the driving drum, a sleeve positioned over said driving shaft, a rotating body mounted upon the sleeve, ratchet means whereby the shaft may be connected with said sleeve, ratchet means for optionally connecting the sleeve with the winding drum, and means whereby said motor may be controlled to wind the spring through the movement of the sleeve or drive the sleeve through the movement of the shaft.

In testimony whereof I have signed my name to this specification.

GEO. L. EMERSON.

Copies of this patent may be obtained for five cents each, by addressing the "Commissioner of Patents, Washington, D. C."